US010581882B2

(12) United States Patent
Mehta

(10) Patent No.: US 10,581,882 B2
(45) Date of Patent: Mar. 3, 2020

(54) SHARED NETWORK FOR INFORMATION SECURITY DATA EXCHANGE

(71) Applicant: Accenture Global Solutions Limited, Dublin (IE)

(72) Inventor: Swen Mehta, Cupertino, CA (US)

(73) Assignee: Accenture Global Solutions Limited, Dublin (IE)

(*) Notice: Subject to any disclaimer, the term of this patent is extended or adjusted under 35 U.S.C. 154(b) by 208 days.

(21) Appl. No.: 15/952,998

(22) Filed: Apr. 13, 2018

(65) Prior Publication Data

US 2019/0319968 A1    Oct. 17, 2019

(51) Int. Cl.
*H04L 29/06* (2006.01)
*G06Q 20/36* (2012.01)

(52) U.S. Cl.
CPC ......... *H04L 63/1416* (2013.01); *G06Q 20/36* (2013.01); *H04L 63/0428* (2013.01)

(58) Field of Classification Search
CPC combination set(s) only.
See application file for complete search history.

(56) References Cited

U.S. PATENT DOCUMENTS

| 9,363,280 B1* | 6/2016 | Rivlin | H04L 63/1416 |
| 2016/0065599 A1* | 3/2016 | Hovor | H04L 67/20 726/23 |
| 2017/0187742 A1* | 6/2017 | Rogers | H04L 63/1433 |
| 2019/0109717 A1* | 4/2019 | Reddy | H04L 9/3239 |

OTHER PUBLICATIONS

Roberts, Facebook Builds Rating System for Its 400-Partner Security Network, Fortune, 2016.*
Morphy, AlienVault OTX: Shining a Light on Enterprise Security Threats, CMSWire, 2015.*
IBM X-Force Exchange Data Sheet, IBM, 2017.*

* cited by examiner

*Primary Examiner* — Minh Dinh
(74) *Attorney, Agent, or Firm* — Fish & Richardson P.C.

(57) ABSTRACT

Implementations are directed to receiving, by a security data exchange platform, security data from an enterprise of a plurality of enterprises, the security data representative of a data security threat against the enterprise, processing the security data to determine a score assigned to the security data, the score being determined based on baseline threat data, providing a data summary to a distributed ledger platform having a private distributed ledger, the data summary being stored to the private distributed ledger, being representative of the security data, and having a smaller memory footprint than the security data, determining, a token value to be associated with the security data, the token value being determined using a smart contract executed on the distributed ledger platform, and being based on the data summary of the security data, and updating, by the distributed ledger platform, a wallet associated with the enterprise to include the token value.

30 Claims, 5 Drawing Sheets

SHARED NETWORK FOR INFORMATION SECURITY DATA EXCHANGE

BACKGROUND

Enterprises often rely on one or more vendors for their information security needs. Information security can include preventing unauthorized access, use, disclosure, disruption, modification, inspection, recording, and/or destruction of data (e.g., user data, customer data, business data). Information security can include identification of assets (e.g., data sources), threats, vulnerabilities, impacts, and possible controls, followed by assessment of the effectiveness of data security measures. However, this information often lies with the vendors that provide data security services, leaving enterprises with only a partial picture of data security operations, and effectiveness. In some instances, enterprises may have insight into data security operations, but have no effective channel for externally leveraging this information.

SUMMARY

Implementations of the present disclosure are generally directed to a security data exchange platform. More specifically, implementations are directed to a distributed ledger-based, security data exchange platform that includes a network of devices and software that automatically share security data (e.g., threats, vulnerabilities) experienced by enterprises with other participants on the network. In some examples, the participants of the network include enterprises, and security vendors. In some examples, a value of security data is determined, and providers of the security data are issued tokens based on the value. Tokens can be redeemed to for security products, and/or subscriptions from participating security vendors, for example.

In some implementations, actions include receiving, by a security data exchange platform, security data from an enterprise of a plurality of enterprises, the security data representative of a data security threat against the enterprise, processing the security data to determine a score assigned to the security data, the score being determined based on baseline threat data, providing a data summary to a distributed ledger platform having a private distributed ledger, the data summary being stored to the private distributed ledger, being representative of the security data, and having a smaller memory footprint than the security data, determining, by the distributed ledger platform, a token value to be associated with the security data, the token value being determined using a smart contract executed on the distributed ledger platform, and being based on the data summary of the security data, and updating, by the distributed ledger platform, a wallet associated with the enterprise to include the token value, the token value being redeemable in a digital security network marketplace for data security services. Other implementations include corresponding systems, apparatus, and computer programs, configured to perform the actions of the methods, encoded on computer storage devices.

These and other implementations can each optionally include one or more of the following features: prior to determining the score, the enterprise is validated to provide assurance that the security data is coming from a legitimate source, and proliferation of improper data can be avoided; prior to determining the score, the security data is masked to remove confidential information associated with the enterprise; masking of the security data at least partially includes assigning a public/private key pair to the security data, and removing an identifier of the enterprise; the baseline threat data includes data representative of multiple data security threats experienced by one or more enterprises, the security data received from the enterprise being compared to the baseline threat data to determine the score; the score is representative of a relative value of the security data; the distributed ledger includes a private blockchain; at least one user of the enterprise is an authorized user, and is enabled access to stored security data of the enterprise; a wallet associated with the enterprise is updated to include the token value responsive to access by an authorized user to the stored security data of the enterprise; and actions further include predicting, by the security data exchange platform, future data security threats against an enterprise of the plurality of enterprises based on the stored security data in the distributed ledger platform.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
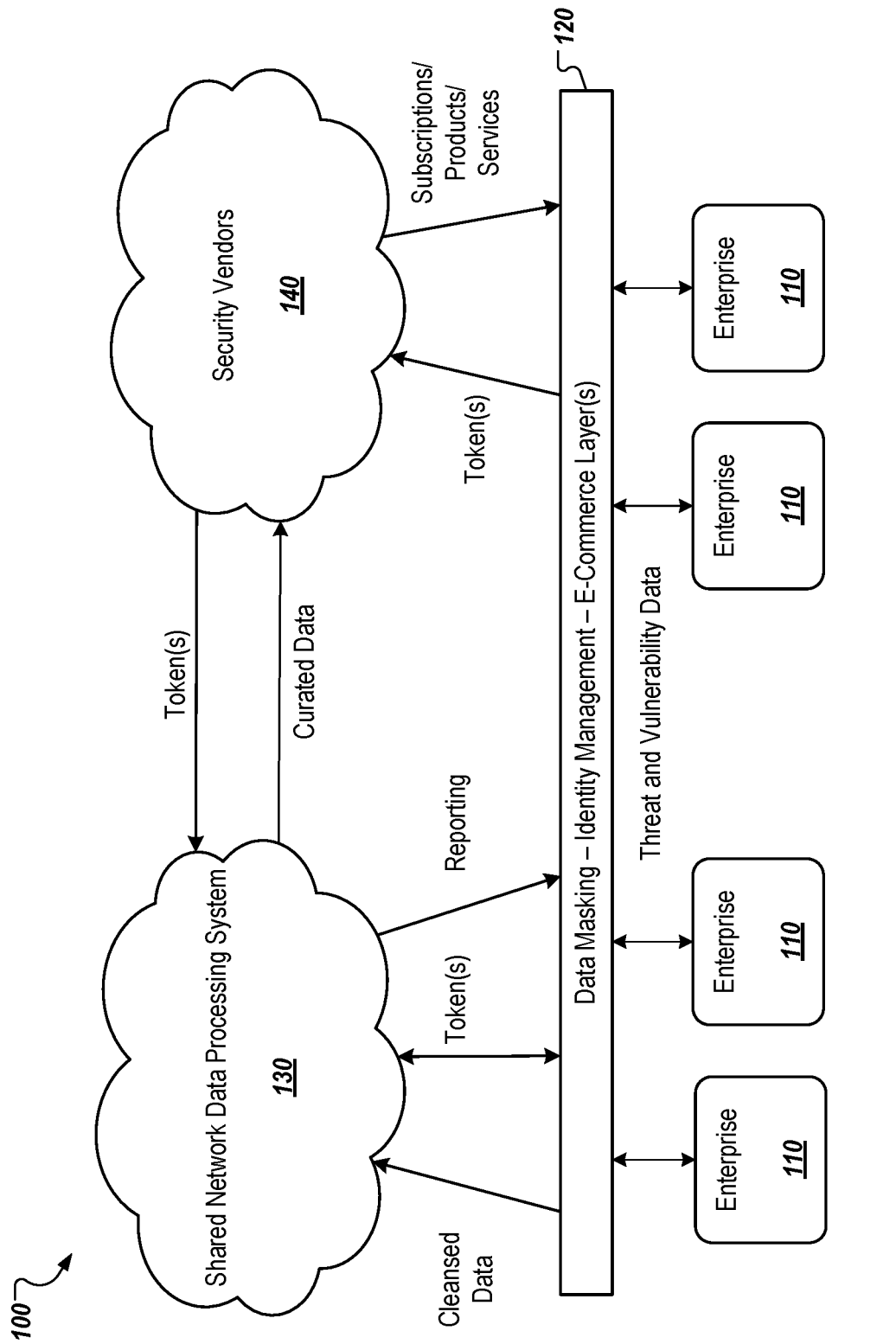
FIG. 1 depicts an example high-level architecture of a security data exchange platform in accordance with implementations of the present disclosure.

Implementations of the present disclosure are generally directed to a security data exchange platform. More specifically, implementations are directed to a distributed ledger-based, security data exchange platform that includes a network of devices and software that automatically shares security data (e.g., threats, vulnerabilities) experienced by enterprises with other participants on the network. In some examples, the participants of the network include enterprises, and security vendors. In some examples, a value of security data is determined, and providers of the security data are issued tokens based on the value. Tokens can be redeemed to for security products, and/or subscriptions from participating security vendors, for example.

In some implementations, actions include receiving, by a security data exchange platform, security data from an enterprise of a plurality of enterprises, the security data representative of a data security threat against the enterprise, processing the security data to determine a score assigned to the security data, the score being determined based on baseline threat data, providing a data summary to a distributed ledger platform having a private distributed ledger, the data summary being stored to the private distributed ledger, being representative of the security data, and having a smaller memory footprint than the security data, determining, by the distributed ledger platform, a token value to be associated with the security data, the token value being determined using a smart contract executed on the distributed ledger platform, and being based on the data summary of the security data, and updating, by the distributed ledger platform, a wallet associated with the enterprise to include the token value, the token value being redeemable in a digital security network marketplace for data security services.

As introduced above, enterprises often rely on one or more vendors for their information security needs. Information security can include preventing unauthorized access, use, disclosure, disruption, modification, inspection, recording, and/or destruction of data (e.g., user data, customer data, business data). Information security can include identification of assets (e.g., data sources), threats, vulnerabilities, impacts, and possible controls, followed by assessment of the effectiveness of data security measures. However, this information often lies with the vendors that provide data security services, leaving enterprises with only a partial picture of data security operations, and effectiveness. In some instances, enterprises may have insight into data security operations, but have no effective channel for externally leveraging this information.

In view of the foregoing, implementations of the present disclosure provide a distributed ledger-based, security data exchange platform that includes a network of devices and software that automatically shares security data (e.g., threats, vulnerabilities) experienced by enterprises with other participants on the network. In some examples, the participants of the network include enterprises, and security vendors. As described in further detail herein, a value of security data is determined, and providers of the security data are issued tokens based on the value, where, for example, tokens can be redeemed to for security products, and/or subscriptions from participating security vendors, for example.

An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a (e.g., public) ledger of transactions that have been executed in one or more contexts (e.g., security information sharing). A blockchain may grow as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., security information, token issuance, token value, contracts, settlement) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., security information) to be transferred between multiple blockchains.

FIG. 1 depicts an example high-level architecture of a security data exchange platform 100 (the "platform") in accordance with implementations of the present disclosure. In general, and as described in further detail herein, the example platform 100 includes a data ingestion portion, a distributed ledger-based (e.g., blockchain-based) portion, and an electronic commerce (e-commerce) portion for sharing security information. The example platform 100 may be provided using multiple computing device(s) of any suitable number, and/or type of computing device. In some examples, one or more portions of the platform 100 are provided as cloud-based services (e.g., Amazon Web Services), and one or more portions of the platform 100 are provided as on-premise services (e.g., by an enterprise itself).

The example platform 100 includes multiple enterprises 110, one or more intermediate layers 120, a shared network data processing system 130, and a security information exchange platform 140. In some examples, each enterprise 110 is a participant in the platform 100, and requires information security services (e.g., provided by one or more vendors). For example, an enterprise 110 may employ threat detection, and remediation services for detecting, and blocking data security threats to its systems. An example threat can include a hacking attempt by one or more malicious users that attempts to breach an enterprise's security system, and retrieve (steal) sensitive data. In response to such instances, a security service can recognize the threat, and take action to prevent the attack. One or more log files can be provided, which record data representative of the instance (e.g., date, time, IP address(es) of attacking device(s), IP address(es) of attacked device(s), enterprise identifier, public key(s), etc.), as well as data representative of how the attack was thwarted (e.g., software measures implemented to block the attack). Such data can be referred to as threat and vulnerability data, which can be collectively referred to as security data. In accordance with implementations of the present disclosure, the security data is provided from the enterprises 110 to the one or more intermediate layers 120.

In some implementations, the one or more intermediate layers 120 include a data masking service, an identity management service, and an electronic commerce (e-commerce) service, each of which is described in further detail herein. In accordance with implementations of the present disclosure, the one or more intermediate layers 120 receive the security data from an enterprise 110. In some examples, identity management functionality can confirm (validate) an identity of the enterprise 110 that is providing the security data. For example, the identity management functionality can cross-reference an identifier of the enterprise (e.g., provided with the security data), to known enterprises to confirm that the security data is indeed being provided by the enterprise claimed, and/or that the enterprise is a participant in the platform 100. In some examples, the identifier includes an enterprise name (e.g., name of legal entity), a unique identifier assigned to the enterprise, an IP address associated with the enterprise, and/or any appropriate combination thereof. By validating the source (enterprise) of the incoming security data, assurance is provided that the security data is coming from a legitimate source, and proliferation of inaccurate/incorrect/insecure data can be avoided.

In response to the enterprise being validated, the identity of the enterprise that provided the security data is masked. In some implementations, a public/private key architecture is used to mask the enterprise identity associated with the security data. In some examples, a public key assigned to the enterprise is associated with the security data, and the identifier is removed from the security data. In some examples, each enterprise is also assigned a private key, which can be used to interact with the platform 100 (e.g., access security data), as described herein.

The one or more intermediate layers 120 further process the security data to provide cleansed data to the shared network data processing system 130. In some examples, cleansing of security data can include, but is not limited to, removing information (e.g., characters), adding information, and/or modifying information to provide the security data in a more suitable format, as cleansed data. In some implementations, the shared network data processing system 130 stores the cleansed data in a so-called data lake (e.g., a storage repository having a flat architecture, which stores data in raw format until needed).

In accordance with implementations of the present disclosure, the (cleansed) security data is processed by the shared network data processing system 130 to assign a score to the security data. In some implementations, and as described in further detail herein, the score represents a relative value of the security data. In some examples, the score is determined based on baseline threat data, and is provided to a distributed ledger system (e.g., blockchain system). For example, the score is provided in a data summary that represents at least a portion of the security data, and the score, the data summary having a smaller memory footprint than the security data. The distributed ledger system processes the data summary to determine a token value that is to be assigned thereto. The token value is added to a wallet of the enterprise that provided the security data.

As described in further detail herein, the enterprise can use token value to purchase data security services. For example, the enterprise can purchase, or subscribe to data security services through the security information exchange platform 140 (also referred to as a security network marketplace). In some examples, the enterprise can provide token value to others (e.g., charities).

Figure 2A:
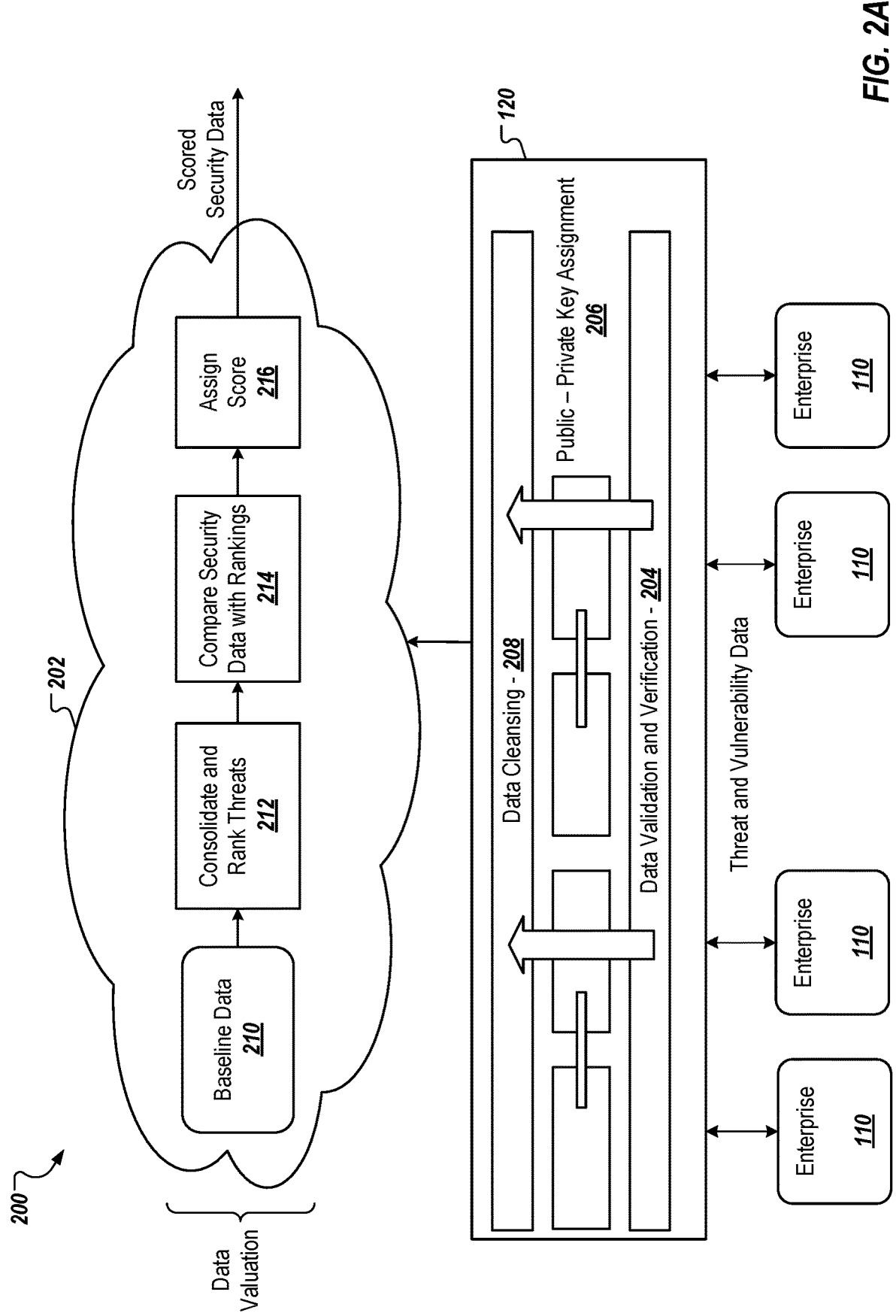
FIGS. 2A and 2B depict example operation of the security data exchange platform of the present disclosure.
Figure 2B:
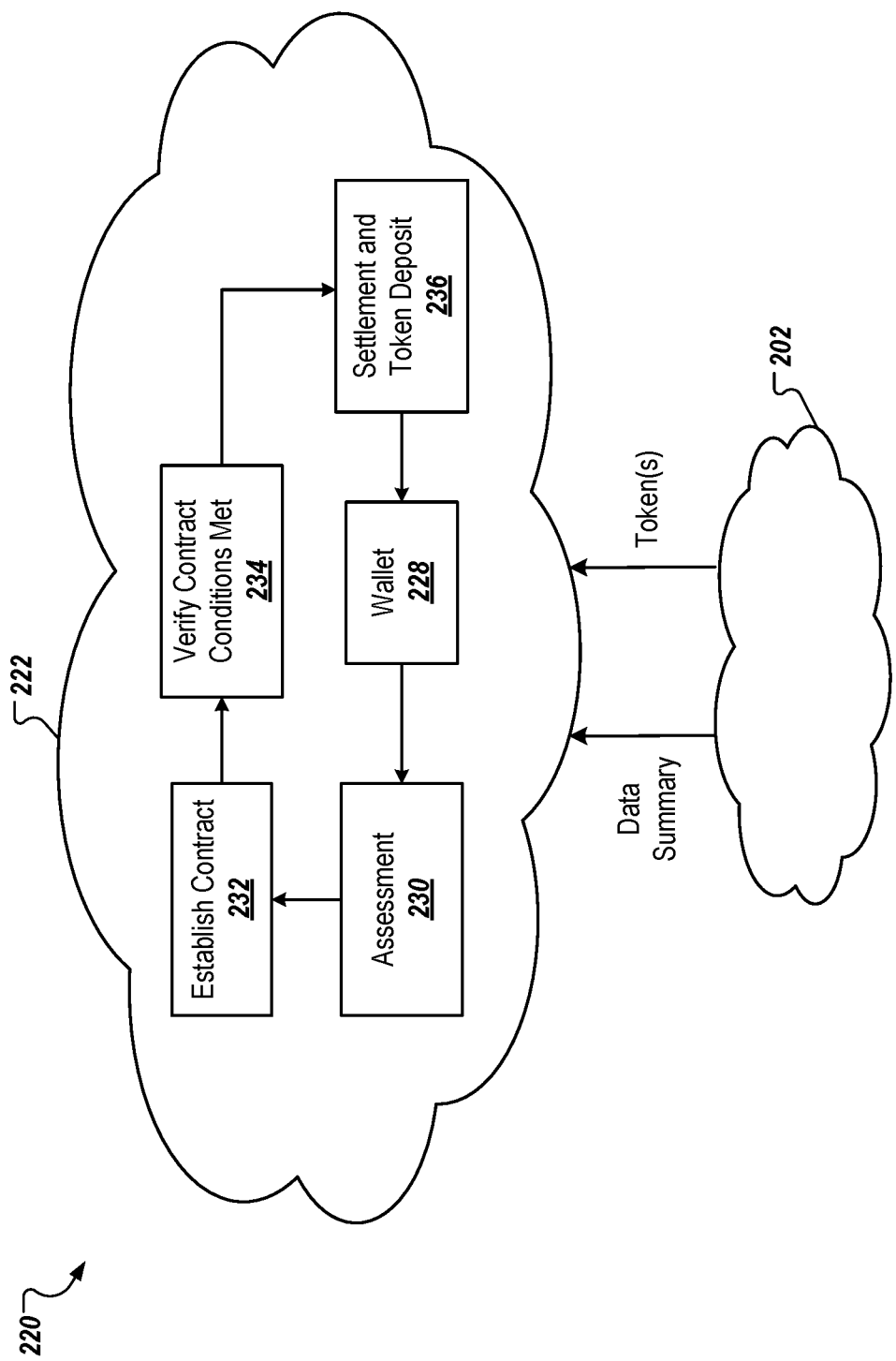

FIGS. 2A and 2B depict example operation of the security data exchange platform of the present disclosure. FIG. 2A depicts an example portion 200 of the example platform 100 of FIG. 1. The example portion 200 includes the enterprises 110, the one or more intermediate layers 120, and data valuation processing 202. In the depicted example, the one or more intermediate layers 120 include a data validation and verification layer 204, a public/private key assignment layer 206, and a data cleansing layer 208. In some examples, one or more components of the data valuation processing 202, and the one or more intermediate layers 120 are provided as hosted services. For example, a third-party hosting service (e.g., Amazon Web Services) can provide cloud-based hosted services.

In the depicted example, security data is received at the intermediate layers 120 from an enterprise 110. In some examples, the security data is received in one or more log files (e.g., .TXT files). The security data is associated with metadata that can indicate the enterprise 110 that is providing the security data. In some implementations, the security data, and/or metadata is processed in the data validation and verification layer 204 to confirm (validate) an identity of the enterprise 110 that is providing the security data. For example, the identifier of the enterprise 110 (e.g., provided with the security data) is cross-referenced with known enterprises to confirm that the security data is indeed being provided by the enterprise claimed, and/or that the enterprise is a participant in the platform 100. In some examples, the platform 100 can maintain a registry of enterprise participants (e.g., enterprises that are signed on for participation in the platform 100), and can cross-reference the received identifier with the registry. In some examples, the identifier can be cross-referenced with a registry of a third-party service provider. For example, a third-party service provider can maintain a database (registry) of enterprises, which can be used to cross-reference with the identifier, and validate the enterprise 110. An example third-party service provider can include Dun & Bradstreet, Inc. In some examples, if the enterprise 110 is not validated, the received security data is not further processed. By validating the source (enterprise) of the incoming security data, assurance is provided that the security data is coming from a legitimate source, and proliferation of improper data (e.g., inaccurate/incorrect/insecure data) can be avoided.

If the enterprise 110 is validated, the security data is processed in the public/private key assignment layer 206. In some examples, a public/private key pair is assigned to the particular enterprise 110 that provided the security data. In some examples, the identifier of the enterprise is removed from the security data. Accordingly, the source of the security data is masked using the private-public key pair. In some examples, multiple levels of security are provided on the security data being sent to the network. In a first level, the enterprise will hash the security data using an algorithm provided by the network administrator, and will also attach the hash of the data along with the data. In a second level, participating enterprises will use their private key to encrypt the data, and will use the network's public key to further encrypt the data. When the network receives the message, it will decrypt the data using the network's private key, and using the sending enterprise's public key. In a third level, the network will run the same hashing algorithm on the data, and compare with the original hash received along with the data. If both the hashes match, the message was not compromised en route from the enterprise.

In some implementations, the (masked) security data is provided to the data cleansing layer 208. In some examples, the data cleansing layer 208 processes the security data for so-called cleansing. Example cleansing of the security data can include, but is not limited to, removing information (e.g., characters), adding information, and/or modifying information to provide the security data in a more suitable format, as cleansed security data. In some examples, data cleansing includes removing identifiable information (e.g., IP addresses, security product names, locations, time stamps, and any other information that can trace the data back to the providing enterprise). Removed data is stored separately in an encrypted database along with the public key of the enterprise, and associated attributes of the message. Post-cleansing, the security data only has the public key associated with it.

The intermediate layers 120 provide the (cleansed) security data to the data valuation processing 202, which processes the security data to assign a score thereto. In some implementations, baseline threat data 210 is provided, and is used to determine the score that is assigned to the security data. In some examples, the baseline threat data 210 is provided from one or more third-party data providers 210. Example third-party data providers can include, without limitation, threat exchanges, such as the ThreatExchange platform provided by Facebook, Inc., the IBM X-Force Exchange provided by International Business Machines Corporation, and the Open Threat Exchange (OTX) platform provided by AlienVault, Inc. For example, threat data provided from one or more third-party threat data providers can provide a baseline indicating top threats for a given time period (e.g., the last 30 days), and how many enterprises have been affected by the respective threats.

In some implementations, the baseline threat data is provided from the platform 100 itself. That is, for example, after the platform 100 has been active for a period of time, a sufficiently large repository of threats can be developed within the platform 100. Consequently, the platform 100 can pull threat data as a baseline from its own repository for downstream processing of security data received from the enterprises 110.

In some implementations, the baseline threat data is consolidated, and ranked 212. For example, baseline threat data can be received from multiple sources (e.g., threat exchanges), and can include redundant threats. Redundant threats are consolidated to provide a single representation of the respective threat. In some examples, threats are ranked to provide a rank order of threats with the most significant threats being ranked higher than less significant threats. In some examples significance of a threat can be based on one or more attributes. Example attributes can include, without limitation, a number of occurrences, dates of occurrences, a number of enterprises affected, a severity of the threat (e.g., major disruption, minor inconvenience). In some examples, a threat having relatively recent, high number of occurrences across a relatively high number of enterprises with relatively significant severity can be ranked relatively high. In contrast, a threat having less recent, low number of occurrences across a relatively low number of enterprises with less significant severity can be ranked relatively low.

The security data received from an enterprise 110 is compared 214 to the ranked threat data to determine a relative value of the security data. The relative value is represented as the score assigned to the security data. For example, the threat data can indicate an active attack that is affecting a significant number of enterprises. If the security data corresponds to that same attack affecting the enterprise 110 that provided the security data, the security data is assigned a score based on the rank of the matching threat data (e.g., 1 on a scale of 0 to 1). If, on the other hand, the security data corresponds to an inactive attack (e.g., last occurrence greater than 30 days ago) that affected a limited number of enterprises, the security data is assigned a score based on the rank of the matching threat data (e.g., 0). In some examples, it can be determined that the security data does not correspond to any of the threats provided in the ranked threat data. For example, the security data can be representative of a new, and/or previously unseen threat. In some examples, the security data can be assigned a relatively high score (e.g., 1), if the security data does not corresponds to a ranked threat. In some examples, the relative value of the threat data is determined based on a weighted sum of the score as determined above, frequency of occurrence, and weight assigned to other attributes. The weights will continue to change as more relevant factors are identified, and included in the valuation algorithm.

The data valuation processing 202 stores the scored security data (e.g., in the data lake, described above). Accordingly, participants in the platform 100 can access the security data, as described in further detail herein. Further, the data valuation processing 202 provides a data summary that is representative of the security data. More particularly, the data summary includes, without limitation, a public key of the enterprise 100 (that provided the security data), and the score assigned to the security data. The data summary is provided as output to, as depicted in FIG. 2B, an example portion 220 of the example platform 100.

The example portion 220 includes a blockchain-based processing system 222 for managing tokens in accordance with implementations of the present disclosure. In some examples, the blockchain-based processing system 222 is provisioned by a third-party service provider (e.g., Ethereum). For example, the blockchain-based processing system 222 can be provisioned on a decentralized platform that runs smart contracts (e.g., provided as computer-executable applications that run as programmed without downtime, censorship, fraud, third-party interference, etc.) on blockchain. In some implementations, each enterprise 110 has respective wallet maintained with the blockchain-based processing system 222, each wallet having an associated key, and a password. In some examples, the wallet is a digital wallet that enables users (enterprises) to manage tokens.

In accordance with implementations of the present disclosure, the data summary from the example portion 200 of FIG. 2A is provided to the blockchain-based processing system 222. By providing the data summary, as opposed to the full record of security data, significant memory efficiencies can be achieved. For example, the blockchain-based processing system 222 can store data using virtual machines (e.g., Ethereum virtual machines (EVMs)), which may have difficulty scaling for significant memory loads. Using the data summary, as opposed to the full security data record, memory efficiencies are gained, alleviating the scaling issue. The blockchain-based processing system 222 processes the data summary to determine a token value that is to be added to a wallet 228 of the providing enterprise 110 based on the score assigned to the security data.

In some implementations, a record is added to the wallet 228 indicating receipt of the data summary (e.g., as one or more data records) from the enterprise 110. For example, the blockchain-based processing system 222 can receive individual records (e.g., data summary representing a single security event), or multiple records (e.g., data summaries representing multiple security events). In some implementations, an assessment 230 is made as to how much compute power is required to process data summary received from the enterprise (e.g., processing power required to process a smart contract on the blockchain in view of the data record(s)). This can be referred to as a work assessment, or gas assessment (e.g., in Ethereum).

In some implementations, a smart contract that is used to provide token value (based on the received data record(s)) is opened on the blockchain 232. In some examples, the smart contract stays open for a period of time (e.g., 30 days). The period of time provides a period, over which additional data records can be received that may influence an ultimate token value of the data record(s) received from the enterprise. For example, additional data record(s) can be received that indicate other instances of the same threat, and/or how the threat was thwarted. Accordingly, the subsequently received data records can provide an a posteriori baseline, to which the original data record can be compared to determine a token value to be assigned to the data record.

As a non-limiting example, a security threat can include a malware attack on an enterprise's routers, which deletes configuration files. If this threat was reported by an enterprise, recorded in the blockchain, and is within the smart contract expiration period, another enterprise reporting the same threat can result in a recurrence attribute being incremented. In some examples, the recurrence attribute continues to be incremented for each new report before the expiration. At the end of the expiration period, the smart contract valuation algorithm will reevaluate the overall value based on the weight assigned to each of the attributes including recurrence. This will ensure that the sending enterprise receives a fair and normalized value for the data as compared to just valuing the data when it is received.

In some implementations, conditions of the smart contract are verified 234. If all conditions are met (e.g., period of time has expired) the smart contract is closed, and settlement and token deposit 236 is performed. That is, the token value that is determined based on the smart contract is deposited to the wallet 228 of the enterprise 110 to complete the initial record recorded in the wallet 228.

Figure 3:
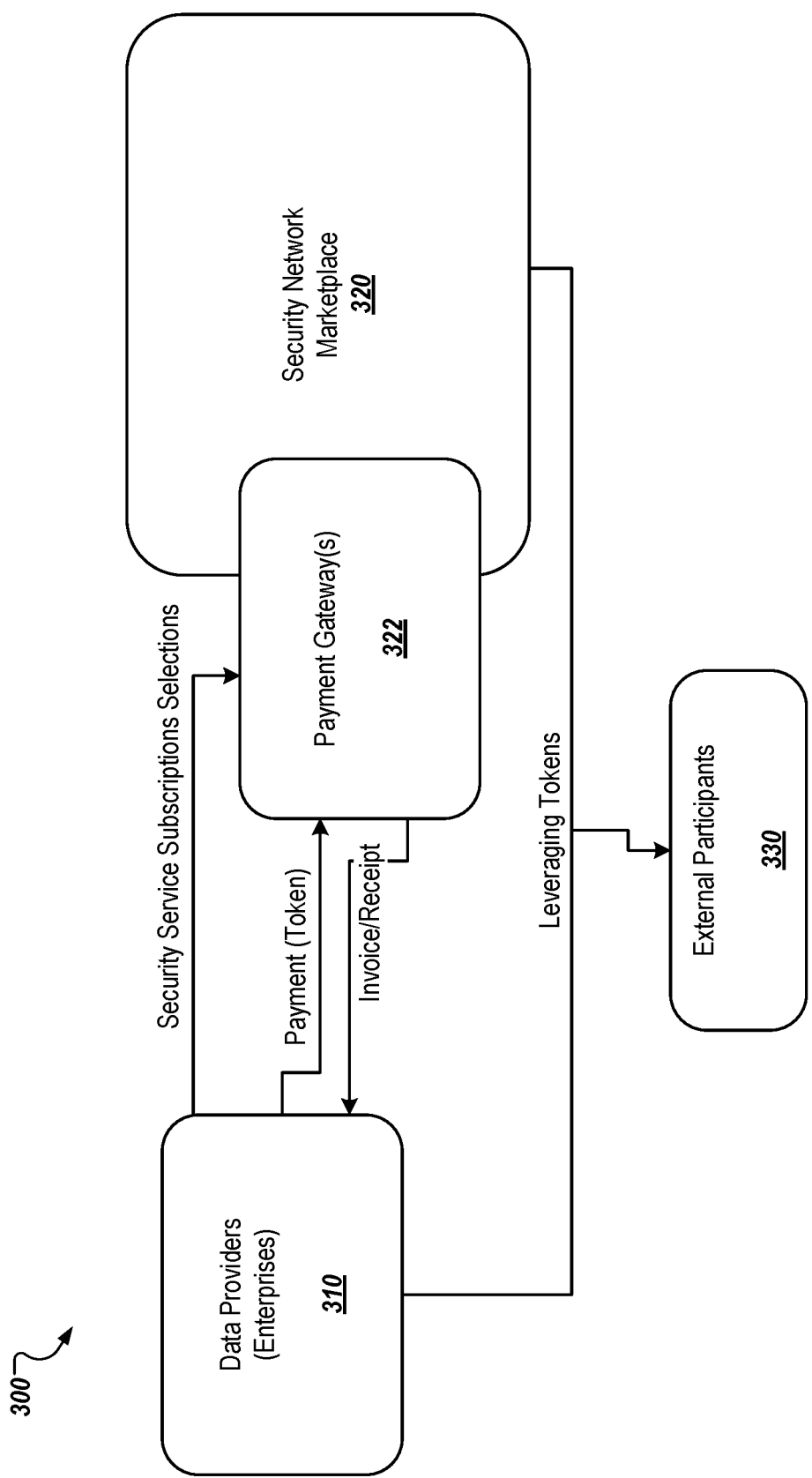
FIG. 3 depicts an example e-commerce architecture in accordance with implementations of the present disclosure.

FIG. 3 depicts an example e-commerce architecture 300 in accordance with implementations of the present disclosure. The example e-commerce architecture 300 can be used by participants (e.g., enterprises, vendors) to use tokens. In the depicted example, the e-commerce architecture 300 includes data providers 310 (e.g., enterprises, vendors), a security network marketplace 320, one or more payment gateways 322, and external participants 330 (e.g., philanthropic organizations, charities). In some examples, the security network marketplace 320 provides data security services that can be purchased by data providers (e.g., enterprises) using tokens obtained through sharing of their security data, as described above with reference to FIGS. 2A and 2B. In some examples, the payment gateway(s) 322 provide respective channel(s), through which token-based payment for security services can be facilitated. An example payment gateway 322 can include, without limitation, CoinPayments, which accepts a multiplicity of digital currencies (e.g., Bitcoin, Litecoin, Dash). In some examples, external participants 330 can benefit from the e-commerce architecture 300 (e.g., tokens can be donated to a charity, which can use the tokens to procure data security services.

Figure 4:
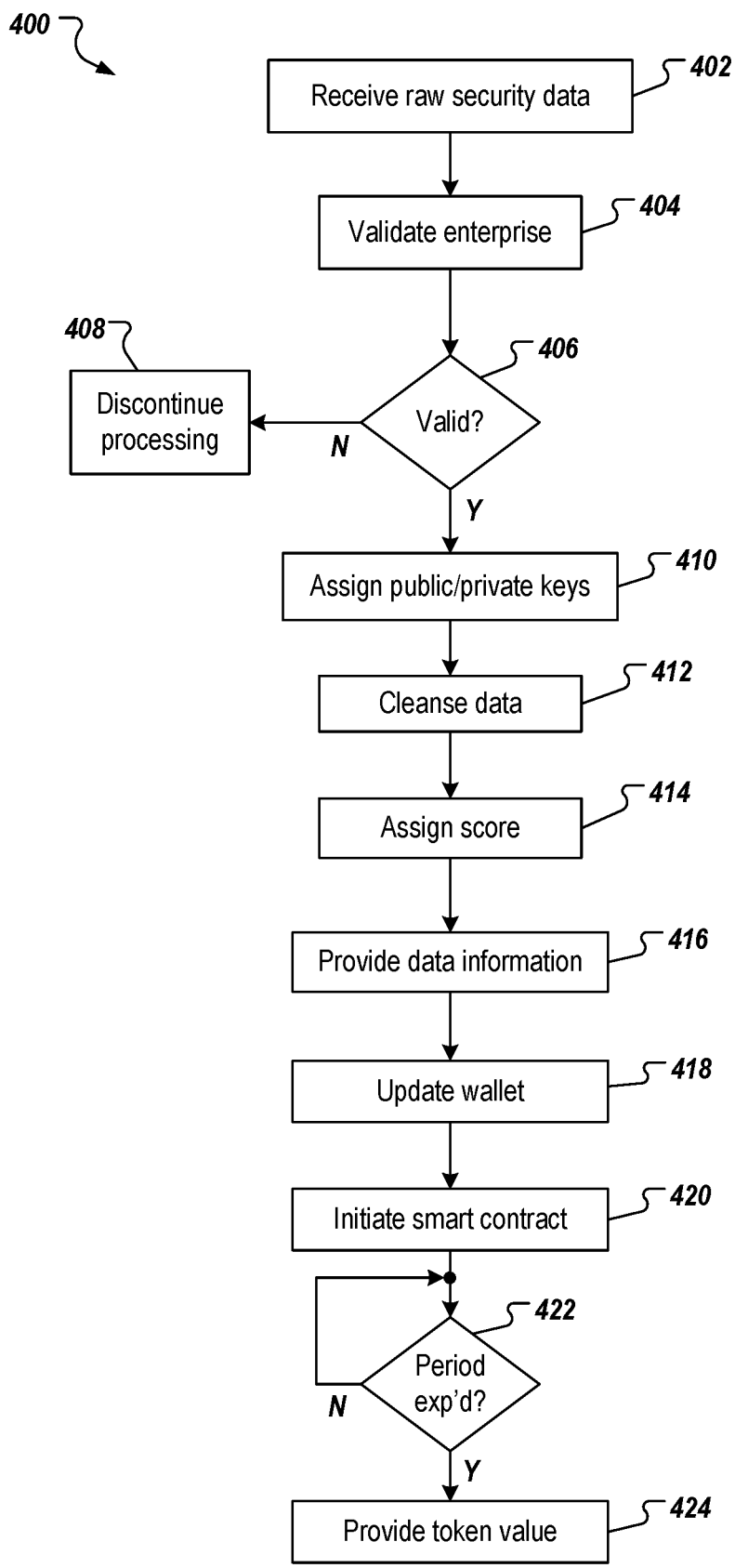
FIG. 4 depicts an example process that can be executed in accordance with implementations of the present disclosure.

FIG. 4 depicts an example process 400 that can be executed in accordance with implementations of the present disclosure. The example process 400 can be provided by one or more computer-executable programs executed by one or more computing devices. For example, the example process 400 can be executed by the example platform 100 of FIG. 1, and, in particular, the example portions 200, 220 of FIGS. 2A and 2B.

Raw security data is received (402). For example, and as described herein, the security data is received at the intermediate layers 120 from an enterprise 110 of FIG. 2A. In some examples, the security data is received in one or more log files (e.g., .TXT files). The security data is associated with metadata that can indicate the enterprise 110 that is providing the security data. The enterprise is validated (404). For example, the security data, and/or metadata is processed in the data validation and verification layer 204 of FIG. 2A to confirm (validate) an identity of the enterprise 110 that is providing the security data. It is determined whether the enterprise is valid (406). If it is determined that the enterprise is not valid, processing of the security data is discontinued (408).

If it is determined that the enterprise is valid, a public/private key pair is assigned to the security data (410). In some examples, a public/private key pair is assigned to the particular enterprise that provided the security data. For example, the public/private key pair can be assigned to the enterprise, when the enterprise registers to participate in the platform, and is used for the enterprise's interactions with the platform. In some examples, the identifier of the enterprise is removed from the security data to mask the identity of the enterprise. The security data is cleansed (412). For example, the data cleansing layer 208 of FIG. 2A processes the security data to remove information (e.g., characters), add information, and/or modify information to provide the security data in a more suitable format as cleansed security data.

A score is assigned to the security data (414). For example, the data valuation processing 202 of FIG. 2A processes the security data to assign a score thereto. In some examples, and as described in detail herein, baseline threat data 210 is provided, and is used to determine the score that is assigned to the security data (e.g., the baseline threats are ranked, and the security data is compared to the ranked threats). A data summary is provided (416). For example, and as described herein, the data valuation processing 202 of FIG. 2A provides a data summary that is representative of the security data, the data summary including a public key of the enterprise (that provided the security data), and the score assigned to the security data.

A wallet is updated (418). For example, and as described herein, the blockchain-based processing system 222 of FIG. 2B receives the data summary, and adds a record to a wallet of the enterprise, the record indicating receipt of the data summary. A smart contract is initiated (420). For example, a smart contract is executed on the blockchain to provide token value (based on the received data record(s)). In some examples, the smart contract stays open for a period of time (e.g., 30 days). As described herein, the period of time provides a period, over which additional data records can be received that may influence an ultimate token value of the data record(s) received from the enterprise. It is determined whether the period has expired, and contract conditions have been met (422). If the period has not expired, the example process 400 loops back. If the period has expired, and contract conditions have been met, a token value is provided, and settlement is executed (424). For example, the token value is determined based on the smart contract, and is deposited to the wallet 228 of the enterprise 110 to complete the initial record recorded in the wallet 228.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors, the method comprising:
   receiving, by a security data exchange platform, security data from an enterprise of a plurality of enterprises, the security data representative of a data security threat against the enterprise;
   processing, by the security data exchange platform, the security data to determine a score assigned to the security data, the score being determined based on baseline threat data;
   providing a data summary to a distributed ledger platform having a private distributed ledger, the data summary being stored to the private distributed ledger, being representative of the security data, and having a smaller memory footprint than the security data;
   determining, by the distributed ledger platform, a token value to be associated with the security data, the token value being determined using a smart contract executed on the distributed ledger platform, and being based on the data summary of the security data; and
   updating, by the distributed ledger platform, a wallet associated with the enterprise to include the token value, the token value being redeemable in a digital security network marketplace for data security services.

2. The method of claim 1, wherein, prior to determining the score, the enterprise is validated to provide assurance that the security data is coming from a legitimate source, and proliferation of improper data can be avoided.

3. The method of claim 1, wherein, prior to determining the score, the security data is masked to remove confidential information associated with the enterprise.

4. The method of claim 3, wherein masking of the security data at least partially includes assigning a public/private key pair to the security data, and removing an identifier of the enterprise.

5. The method of claim 1, wherein the baseline threat data comprises data representative of multiple data security threats experienced by one or more enterprises, the security data received from the enterprise being compared to the baseline threat data to determine the score.

6. The method of claim 1, wherein the score is representative of a relative value of the security data.

7. The method of claim 1, wherein the distributed ledger comprises a private blockchain.

8. The method of claim 1, wherein at least one user of the enterprise is an authorized user, and is enabled access to stored security data of the enterprise.

9. The method of claim 1, wherein a wallet associated with the enterprise is updated to include the token value responsive to access by an authorized user to the stored security data of the enterprise.

10. The method of claim 1, further comprising predicting, by the security data exchange platform, future data security threats against an enterprise of the plurality of enterprises based on the stored security data in the distributed ledger platform.

11. One or more non-transitory computer-readable storage media coupled to one or more processors and having instructions stored thereon which, when executed by the one or more processors, cause the one or more processors to perform operations comprising:
   receiving, by a security data exchange platform, security data from an enterprise of a plurality of enterprises, the security data representative of a data security threat against the enterprise;
   processing, by the security data exchange platform, the security data to determine a score assigned to the security data, the score being determined based on baseline threat data;
   providing a data summary to a distributed ledger platform having a private distributed ledger, the data summary being stored to the private distributed ledger, being representative of the security data, and having a smaller memory footprint than the security data;
   determining, by the distributed ledger platform, a token value to be associated with the security data, the token value being determined using a smart contract executed on the distributed ledger platform, and being based on the data summary of the security data; and updating, by the distributed ledger platform, a wallet associated with the enterprise to include the token value, the token value being redeemable in a digital security network marketplace for data security services.

12. The computer-readable storage media of claim 11, wherein, prior to determining the score, the enterprise is validated to provide assurance that the security data is coming from a legitimate source, and proliferation of improper data can be avoided.

13. The computer-readable storage media of claim 11, wherein, prior to determining the score, the security data is masked to remove confidential information associated with the enterprise.

14. The computer-readable storage media of claim 13, wherein masking of the security data at least partially includes assigning a public/private key pair to the security data, and removing an identifier of the enterprise.

15. The computer-readable storage media of claim 11, wherein the baseline threat data comprises data representative of multiple data security threats experienced by one or more enterprises, the security data received from the enterprise being compared to the baseline threat data to determine the score.

16. The computer-readable storage media of claim 11, wherein the score is representative of a relative value of the security data.

17. The computer-readable storage media of claim 11, wherein the distributed ledger comprises a private blockchain.

18. The computer-readable storage media of claim 11, wherein at least one user of the enterprise is an authorized user, and is enabled access to stored security data of the enterprise.

19. The computer-readable storage media of claim 11, wherein a wallet associated with the enterprise is updated to include the token value responsive to access by an authorized user to the stored security data of the enterprise.

20. The computer-readable storage media of claim 11, wherein operations further comprise predicting, by the security data exchange platform, future data security threats against an enterprise of the plurality of enterprises based on the stored security data in the distributed ledger platform.

21. A system, comprising:
one or more processors; and
a computer-readable storage device coupled to the one or more processors and having instructions stored thereon which, when executed by the one or more processors, cause the one or more processors to perform operations comprising:
receiving, by a security data exchange platform, security data from an enterprise of a plurality of enterprises, the security data representative of a data security threat against the enterprise,
processing, by the security data exchange platform, the security data to determine a score assigned to the security data, the score being determined based on baseline threat data,
providing a data summary to a distributed ledger platform having a private distributed ledger, the data summary being stored to the private distributed ledger, being representative of the security data, and having a smaller memory footprint than the security data,
determining, by the distributed ledger platform, a token value to be associated with the security data, the token value being determined using a smart contract executed on the distributed ledger platform, and being based on the data summary of the security data, and
updating, by the distributed ledger platform, a wallet associated with the enterprise to include the token value, the token value being redeemable in a digital security network marketplace for data security services.

22. The system of claim 21, wherein, prior to determining the score, the enterprise is validated to provide assurance that the security data is coming from a legitimate source, and proliferation of improper data can be avoided.

23. The system of claim 21, wherein, prior to determining the score, the security data is masked to remove confidential information associated with the enterprise.

24. The system of claim 23, wherein masking of the security data at least partially includes assigning a public/private key pair to the security data, and removing an identifier of the enterprise.

25. The system of claim 21, wherein the baseline threat data comprises data representative of multiple data security threats experienced by one or more enterprises, the security data received from the enterprise being compared to the baseline threat data to determine the score.

26. The system of claim 21, wherein the score is representative of a relative value of the security data.

27. The system of claim 21, wherein the distributed ledger comprises a private blockchain.

28. The system of claim 21, wherein at least one user of the enterprise is an authorized user, and is enabled access to stored security data of the enterprise.

29. The system of claim 21, wherein a wallet associated with the enterprise is updated to include the token value responsive to access by an authorized user to the stored security data of the enterprise.

30. The system of claim 21, wherein operations further comprise predicting, by the security data exchange platform, future data security threats against an enterprise of the plurality of enterprises based on the stored security data in the distributed ledger platform.

* * * * *